United States Patent
Buettner

[15] 3,638,490
[45] Feb. 1, 1972

[54] FLUID FLOW MEASURING DEVICE

[72] Inventor: Carl F. Buettner, 9501 Pine Spray Court, Crestwood, Mo. 63126

[22] Filed: Jan. 17, 1969

[21] Appl. No.: 791,948

[52] U.S. Cl. .................................73/212, 73/194 R, 73/302
[51] Int. Cl. ...........................................................G01f 1/00
[58] Field of Search.....................73/212, 194, 203, 439, 302

[56] References Cited

UNITED STATES PATENTS

| | | | |
|---|---|---|---|
| 3,573,019 | 3/1971 | Rees | 73/212 X |
| 1,100,867 | 6/1914 | Dexter | 73/302 |
| 2,658,389 | 11/1953 | Eby | 73/302 |
| 1,761,295 | 6/1930 | Greenfield | 73/439 |
| 3,422,682 | 1/1969 | Evans et al. | 73/212 |

FOREIGN PATENTS OR APPLICATIONS

| | | | |
|---|---|---|---|
| 748,243 | 4/1933 | France | 73/302 |

OTHER PUBLICATIONS

King– Gage System Catalog 1010– A, July 1963, King Engineering Corp., Ann Arbor, Mich. pp. 10– 14.

*Primary Examiner*—Richard C. Queisser
*Assistant Examiner*—John P. Beauchamp
*Attorney*—Charles B. Haverstock

[57] ABSTRACT

Means for determining the velocity and depth of a flowing body of fluid such as fluid flowing in a water or sewer main, said means including conduit means immersed in the flowing fluid, means forcing gas out through the immersed conduit means into the fluid, and other means responsive to the force or pressure required to force gas into the stream, said last-named means being calibrated to indicate and/or record information from which the depth and/or velocity of the fluid body can be determined.

21 Claims, 8 Drawing Figures

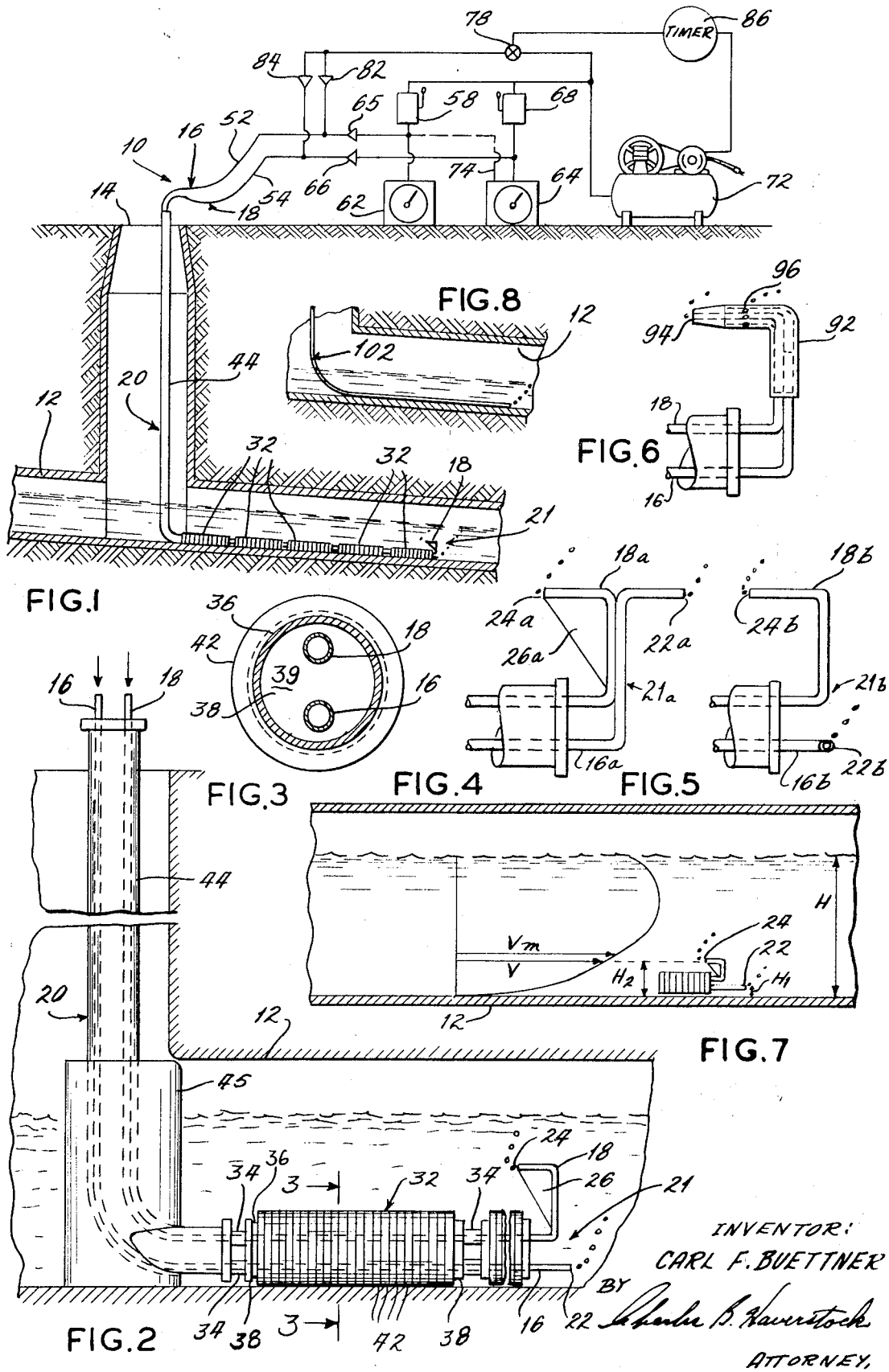

FLUID FLOW MEASURING DEVICE

There are many known methods and devices for determining the depth and velocity of fluid flows in conduits or pipes and some are used to measure or determine fluids flows which may contain solids or partially solid substances in the flow as in the case of sewer flows. The known means include devices such as current meters, venturi meters, orifice plates, weirs and floats, salt concentration dispensing devices and other devices as well. For the most part, however, the known flow measuring devices have not been reliable or accurate, have not been able to provide continuous data, and have had other shortcomings and disadvantages especially when used to measure flows of contaminated fluids such as sewer flows. This is mainly because most of the known flow measuring devices to be accurate require a contained flow such as one that completely fills the conduit or pipe in which it flows, and in some of the known devices suspended solid matter or particles as are normally present in waste or sewer flows tend to clog them, interfere with their operation and also adversely affect their accuracy. For example, floats and weirs have been used for measuring flows such as sewer flows but the float mechanisms of such devices often become fouled with paper, sticks and other debris, and the buildup of solids behind a weir soon renders it useless. Float and weir means are also unsuitable and impractical for measuring flows in sewer mains located under streets and highways because to install them usually requires relatively extensive excavation and other work which is disrupting to the surface traffic. Such devices in addition to their extensive installation requirements are also generally not portable and therefore must be permanently installed which is a further disadvantage, and they are therefore not practical to use in many situations including the studying of the flow patterns of a sewer or other flow system where data must be obtained at a relatively large number of different locations in the system to be meaningful because the cost of installing devices such as float and weir devices at many different locations in a system is usually prohibitive.

Other means and methods for measuring fluid flows have also been used with varying degrees of success including those mentioned above. For example, salts or dyes can be placed in a fluid stream such as in a sewer main at an upstream location and the time measured until the salt or dye appears or is sensed at a downstream location a known distance away. This way of measuring may have some value in simple systems where instantaneous measurement is not required but is too inaccurate and unreliable because of the fact that the presence of the salt or dye at the downstream location must be determined in some manner which in itself is relatively unreliable especially as the salt or dye becomes more diffused in the flow and therefore less easy to detect or observe. Such methods therefore depend to a large extent on the skill of the observer or the sensitivity of the observation device and on how the salt or dye diffuses into the stream. Furthermore, since such tests require a certain amount of time for each measurement they cannot provide continuous data as can the present device.

Other devices such as magnetic flow meters, devices which introduce ping-pong balls or like devices into the flow stream in a manner similar to a slat or dye, and devices which pump the sewer water up one manhole, measure its flow through a flume or weir of known construction above ground, and then allow it to flow back into its normal channel at a manhole downstream from where it was pumped out, all have very definite shortcomings and disadvantages, and fall short of the true objective which is to provide a relatively inexpensive, easy to install and operate device which is accurate and continuous in operation and which provides information from which fluid flow and particularly fluid flow in sewer or water systems can be determined.

The present invention overcomes these and other disadvantages and shortcomings of known fluid flow measuring devices by teaching the construction and operation of accurate means for obtaining information from which to determine on a continuous basis, if desired, the velocity and depth of fluid flowing in a channel, conduit or pipe. The present means are also relatively self-cleansing, are relatively unaffected by debris including solid and partially solid substances that may be contained in the flowing fluid being measured, they can function unattended for relatively long periods of time, and they can be constructed to be relatively compact for ease of installation in a flow channel including in a water or sewer main without appreciably changing the flow characteristics of the fluid in the main. The subject means can also be installed in mains at conjested locations such as under busy traffic thoroughfares with little or no interruption of the traffic thereat.

The present invention in its preferred form includes two open tubes which have their open ends installed immersed in a fluid flow to be measured. The tubes extend from their open ends to a remote location where means are connected to their opposite ends for controllably forcing gas therethrough and out the immersed open ends, and for monitoring the pressure in the tubes, which means may include means to indicate and/or record the pressures being monitored. The device also includes means to maintain the tubes in proper orientation in the flow so that one of the tube ends will mainly have static pressure acting on it and the other tube will have static pressure plus the velocity pressure acting on it. Gas, usually at a predetermined flow rate which may be different for each tube, is pumped into and through each of the tubes and escapes out the respective immersed open ends thereof into the flow. The pressure of the gas in each tube, which is a function of the pressure at the respective open end thereof, is accurately monitored and indicated and/or recorded by suitable pressure sensitive means. The pressure readings thus obtained depend on and vary with the depth and velocity of the flowing fluid at the respective tube ends, and this information can then be used to calculate the depth and velocity of the fluid thereat. From the calculations of the depth and velocity and by knowing the size and cross-sectional shape of the pipe or main, an accurate calculation can also be made of the volume flow rate at any given time or the average volume flow rate over any selected time period. Once this flow information has been obtained at a specific location and for a range of depths and velocities thereat, a much simpler and more economical embodiment of the present device can be substituted if desired for later monitoring purposes at the same location as will be explained.

The fluid flow information obtainable using the present device is important particularly to large sewer and water users because such information provides a way to more accurately determine sewer and water bills than heretofore has been known or available, and in many cases results in substantial savings to the user in the form of reduced water and/or sewer bills. The device can also be used particularly by sewer utilities to measure and monitor flows at different locations in their systems to get an overall picture of the flow pattern and to better understand how the total system as well as the individual parts thereof are operating. This overall picture of the flow pattern of a system enables system engineers or others to make more accurate predictions than heretofore have been possible as to future needs for expansions of the system and/or of the treatment facilities associated therewith.

In the preferred embodiment of the present device certain quantities of gas or air continuously escape out the immersed tube ends into the flow as aforesaid. This escaping gas to a large extent tends to automatically keep the submerged tube ends clean and in an unclogged condition. Other means may also be employed to assure that the tubes remain unclogged and in proper operating condition and they will be described hereinafter.

The device can be optionally constructed so that predetermined pressures instead of predetermined flow rates are maintained in the tubes. When predetermined pressures are maintained in the tubes the data readings from which to calculate the depth and velocity of the fluid are obtained from gas flow rate sensitive means instead of pressure sensitive means. This optional construction may have some disadvantages in certain applications however, because in such an embodiment of the present device the cleansing action provided by the escaping gas is reduced as the fluid depth and velocity increases. This is so because the flow rate instead of being constant as in the first discussed embodiment varies inversely with the depth and velocity of the fluid flow and in extreme cases might stop altogether.

It is therefore a principal object of the present invention to provide relatively accurate means for measuring fluid flows.

Another object is to provide relatively simple and inexpensive means for measuring fluid flows.

Another object is to provide means for more accurately determining flows in open as well as in full or partially full conduits.

Another object is to provide means capable of being used to accurately determine flows in fluid streams such as in water and sewer mains, including streams that may contain debris, trash and other solid or semisolid substances.

Another object is to provide means for gathering information from which the fluid flow characteristics of a stream can be determined, said means being relatively portable and quickly and easily installed and removed from a fluid stream including streams located in relatively inaccessible and difficult to reach places.

Another object to provide substantially self-cleaning waste water measuring means.

Another object is to provide means for obtaining information about fluid streams which can be installed in large as well as in small flow conduits or mains.

Another object is to provide means for obtaining accurate data from which to determine the velocity and depth of a fluid body, which means can be operated unattended.

Another object is to provide a probe assembly for use immersed in a fluid flow and which includes means for maintaining itself in the best possible operating position in the flow.

Another object is to provide a fluid measuring device which can be installed in a fluid flow to be measured without appreciably disturbing or changing the flow pattern.

Another object is to provide a way for accurately calibrating simple and inexpensive fluid measuring devices.

These and other objects and advantages of the present invention will become apparent after considering the following detailed specification which covers several preferred embodiments thereof in conjunction with the accompanying drawing, wherein:

FIG. 1 is a schematic view showing a preferred embodiment of a device for use in obtaining data about a fluid stream, said device being shown in operative condition positioned in a sewer or like main and constructed according to the present invention;

FIG. 2 is an enlarged fragmented side view of a probe assembly portion for use on a device such as that shown in FIG. 1;

FIG. 3 is an enlarged cross-sectional view taken on line 3—3 of FIG. 2;

FIG. 4 is an enlarged side view showing a modified form of the measuring head portion of the device of FIG. 2;

FIG. 5 is an enlarged side view showing another form of measuring head for use on the subject device;

FIG. 6 is an enlarged side view showing yet another embodiment of a measuring head;

FIG. 7 is a cross-sectional view showing the relationships between the fluid depth, the velocities of the fluid flow, and the position of the measuring head portion of the present device; and, FIG. 8 is a cross-sectional view showing a greatly simplified alternate embodiment of the immersed portion of the subject device.

Referring to the drawing more particularly by reference numbers, the number 10 in FIG. 1 refers to a fluid flow measuring device constructed according to the teachings of the present invention, said device being shown installed in a sewer main 12 near a manhole opening 14. The device 10 includes two air or gas tubes 16 and 18, parts of which extend through a probe assembly 20 and are formed at one end which is the end that is immersed in the flow stream, into a measuring head portion 21. The measuring head 21 is defined in part by the open tube ends 22 and 24 of the tubes 16 and 18 respectively which are portions thereof that are immersed in the fluid.

The tube 16 and its associated tube end 22 is used for obtaining data from which the static pressure, which is a measure of the fluid depth at the tube end 22, can be determined. As shown in FIG. 2 the tube end 22 is preferably positioned at or near the bottom of the flow facing downstream.

The other tube 18 and its associated end 24 is provided primarily for obtaining data from which to determine the velocity pressure of the fluid and is formed and positioned with its open end 24 facing upstream as shown in FIGS. 1 and 2. The open tube end 24 is also shown preferably located at some predetermined distance above the bottom of the flow (or of the sewer main 12) to make sure that it will be affected by the velocity of the fluid flowing thereby. The static pressure at the tube end 24 will also affect the data obtained thereby but the effect of the static pressure on this tube end can be compensated for in making the velocity determinations as will be explained. The tube ends 22 and 24 may also include specially constructed orifice members or the tube ends may be necked down to form outlet ends or orifices of predetermined size for certain purposes such as to reduce the amount of air flow required to obtain accurate results.

A knife edge member 26 (FIG. 2) may also optionally be provided adjacent to the tube end 24 on the upstream side thereof to help to cut loose any solid or semisolid substances such as waste materials carried by the stream which otherwise might accumulate thereon and obstruct or block normal operation and the obtaining of accurate information therefrom. The knife member 26 materially reduces the chance that particles will cling to and clog the upstream facing tube end 24 and without adversely affecting the flow of the stream. To some extent, however, the effectiveness of the knife member 26 will depend on the types of solids in the fluid and the speed of movement of the fluid thereby and, of course, no such member is required when the subject device is to be used in clean or substantially clean streams.

The tubes 16 and 18 extend from the measuring head 21 through one or more tube positioning subassemblies 32 which form most of the immersed portions of the probe assembly 20 as shown in FIGS. 1 and 2. The subassemblies 32 encase sections of the tubes 16 and 18 which extend therethrough and are connected together by flexible means such as by hoses 34 which form flexible connections between the sections of the tubes 16 and 18. The subassemblies 32 are therefore movable relative to each other or articulated so that they can easily be installed in the main 12 by being inserted down through the manhole 14. The articulation of the sub assemblies 32 also enables them to be able to conform to the bottom of the main even when the bottom of the main may be uneven and rough. Each of the subassemblies 32 includes a tubular member 36 which extends between larger diameter connected end caps 38. The tubular members 36 and and end caps 38 enclose portions of the tube sections and define therewith a water tight chamber 39 thereabout so the subassemblies do not collect sewage therein. Annular weights or ring members 42 are loosely positioned on each of the tubular members 36 and are retained thereon by the end caps 38. The rings 42 are free to rotate on the tubular members 36 and they act both as rollers to prevent the subassemblies 32 from climbing the walls of the sewer main and as weights to hold the subassemblies 32 at the bottommost portion of the main 12. If the immersed portions of the probe assembly 20 should for any reason start to climb the wall of the main, the rings 42 will rotate and their weight will cause them to return to their proper positions. This automatic positioning is aided by the articulated connections between the subassemblies 32 and is important to maintain the open tube ends 22 and 24 in their proper operating positions in the flow stream.

The weighted tube positioning subassemblies 32 are coupled by flexible means such as by hoses 34 to the portion of the tubes 16 and 18 which extend out of the lower end of elongated L-shaped tubular member 44 which is also part of the probe assembly 20. The tubes 16 and 18 extend through the L-shaped member 44 from the lower end thereof which is immersed in the flow and out the upper end thereof which is shown in the drawings located above ground level at the top of the manhole 14. The lower immersed end of the L-shaped member 44 is positioned extending downstream from the vertical portion thereof in alignment with the subassemblies 32 and generally parallel to the bottom of the sewer main 12. The tubes 16 and 18 are also shown in spaced vertical relation to each other from where they enter the lower end of the member 44 to the measuring head 21, and the flexible connection means 34 allow for some horizontal movement between the subassemblies 32 and the member 44 but relatively little vertical movement or rotational motion therebetween. The member 44 is preferably rigid and when the probe assembly 20 is inserted in the main 12 with the upwardly extending portion of the member 44 substantially vertically oriented in the manhole 14, the open tube ends 22 and 24 will be also oriented vertically which is their proper orientation with respect to the flow in the sewer main. As shown in FIG. 2, streamlining means such as member 45 can be attached to the member 44 to minimize turbulence in the flow as it moves past the immersed upstream portions of the member 44. The provision of the streamlining means 45 is relatively important especially when the device is to be installed in a relatively high velocity flow since in such flows the turbulence which would otherwise be caused might adversely affect the measurements obtained thereby. In some cases it may also be necessary to increase the distance between the lower upstream end of the member 44 and the measuring head 21 of the device to minimize the effects of turbulence. It is also contemplated to construct the member 44 so that its upper end when installed is below ground level.

The tubes 16 and 18 extend upwardly through the vertical member 44 and exit therefrom preferably about ground level where they are connected respectively to other gas lines or hoses 52 and 54. The hose 52 forms an above ground extension of the tube 16 and is connected to and through an optional check valve 65, which is oriented to allow gas flow only toward the open immersed tube end 22, to a rotometer device 58 and to pressure sensitive means 62. The pressure sensitive means 62 can be of an indicating and/or recording type and can respond to the pressure in the tube 16 which is a measure of the resistance to gas flow in the tube caused by the fluid being measured. The other hose 54 is an extension of the tube 18 and is connected to and through another optional check valve 66 to a second rotometer 68 and to other pressure sensitive means 64. Both of the rotometers 58 and 68 are connected on their opposite sides to a source of compressed gas such as to the output side of a compressed air source shown as air compressor 72. The compressor 72 furnishes air at a relatively high pressure to the inlet sides of the rotometers 58 and 68 which are adjusted to allow predetermined amounts of air to constantly flow into the inlet ends of the tubes 16 and 18, respectively, through the associated check valves 65 and 66.

The air that flows through the respective tubes 16 and 18 is then discharged or expelled from the immersed open ends 22 and 24. The pressure in the tubes 16 and 18 will vary depending on the depth of the fluid at the tube ends and also on the velocity of the fluid thereat. In the case of the downstream opening tube 16 the main variable is the static pressure (depth to which the tube end 22 is immersed), and in the case of the upstream exhausting tube 18 the air pressure or air flow will depend on the static pressure as well as on the velocity of the flow at the tube end 24. These variables are sensed and indicated or recorded by the respective pressure sensitive means 62 and 64, which may include means to continuously indicated and/or record the information.

With some arrangements of the open tube ends 22 and 24 such as when they are both positioned to exhaust at the same depth of fluid, see FIGS. 4 and 6, the press in both tubes due only to static pressure will be the same and the difference between the pressures sensed by the means 62 and 64 will be a direct indication of the pressure due to fluid velocity only. When this is the case, the device as shown in FIG. 1 can be modified by including an optional connection 74 shown in broken line between the tube 52 and the pressure sensitive means 64. In this case, the sensitive means 64 can be constructed and adjusted to indicate and/or record the differential pressure between the pressure in the tube 16 and the pressure in the tube 18, and the sensitive means 62 can be used to indicate or record the pressure due only to the static pressure at the tube ends. The differential pressure sensed by the means 64 will therefore vary in direct proportion to the velocity of the fluid at the point of measurement. The optional addition of the connection 74 therefore simplifies the calculations required to obtain useful information from the raw data obtained by the sensitive means 62 and 64. This will be described more in detail later.

The compressed gas source or compressor 72 is also shown in FIG. 1 optionally connected to the input ends of the tubes 16 and 18 more directly through a valve 78 and through respective check valves 82 and 84. The check valves 82 and 84 are oriented so that the output of the compressor 72 can be more directly fed to the tubes 16 and 18 whenever the valve 78 is opened. This is done to provide higher pressure blasts of air or gas into the tubes to clean the tubes and tube ends of any foreign substances that may have accumulated. A timer such as electrical timer 86 may optionally be included to energize and open the valve 78, which may be a solenoid operated valve, at predetermined intervals in order to send the blasts or air or gas down the tubes 16 and 18 and out their immersed open ends. This is done as aforesaid to clean out any debris or obstruction that might have accumulated especially at the immersed ends of the tubes which otherwise might impair their operation or alter their operating characteristics. At the same time these blasts of air may also cause the head portion 21 including the subassemblies 32 to vibrate or move back and forth to some extent. This is desirable to assure that the probe assembly 20 including the measuring head is maintained in the best possible operating position on the bottom of the main 12. The check valves 65 and 66 are provided to isolate the pressure sensitive means from the air blasts to prevent damage thereto. False readings will occur at these times but can readily be recognized and disregarded. The valve 78 can also be made to operate automatically in response to the selected condition sensed by the sensitive means 62 and/or 64 so that if either or both of these means sense a pressure that is too high or above the expected operating range for the velocity and/or the depths of fluid involved indicating that one or both of the tube ends may be partially or completely clogged the valve 78 will open and admit a blast of air to clear the offending condition. Means (not shown) may also be provided to manually operate the valve 78 as desired. The means for unclogging the tube ends 22 and 24 are usually desirable if not essential when the subject device is installed in a sewer or other flow which has considerable solid or partially solid substances or debris in it including substances which could easily obstruct the tube ends including substances such as paper, rags, plastic, rubber and like substances as well as the more usual things found in sewer systems.

FIGS. 2, 4, 5 and 6 show various constructions and arrangements of the immersed ends of tubes 16 and 18 which can be used in the present device depending upon the type of system in which the device is installed and the accuracy of the measurements required. The measuring head 21a shown in FIG. 4 includes an open tube end 24a of velocity measuring tube 18a which is shaped similarly to the open tube end portion 24 of the tube 18 discussed above in connection with FIG. 2. This embodiment also has means forming an upstream facing knife 26a attached thereto. The measuring head 21a differs, however, from head 21 in that its static tube 16a has its exhaust end 22a constructed to open at the same elevation in the flow stream as the velocity tube end 24a but facing downstream instead of upstream. In particular constructions shown in FIGS. 2 and 4 a correction factor is sometimes needed to determine the actual static pressure since in the construction of FIG. 4, and to a lesser extent in the construction of FIG. 2, the pressure generated at the downstream facing tube end 22a (or 22) is affected by the velocity of the flow thereby. This correction is usually less for the tube end 22 than for the tube end 22a because the velocity of the flow, as can be seen in the curve of FIG. 7, is less adjacent the bottom wall of the main than it is at some point thereabove. No similar correction factor is usually needed for the heads shown in FIGS. 5 and 6 since in these constructions the outlet or outlets for the static tube end faces sidewardly relative to the direction of flow and therefore are relatively unaffected by the velocity of the fluid. FIG. 5, for example, shows a measuring head 21b having a static pressure measuring tube 16b which has its open end 22b oriented to exhaust sidewardly into the flow and at a location near to the bottom of the main. With this construction the pressure acting at the open tube end 22b is very nearly entirely due to the static pressure and is relatively unaffected by the fluid velocity.

In FIG. 6 the immersed ends of the tubes 16 and 18 are connected to a pitot type assembly 92 which has an upstream facing orifice or opening 94 communicating with the tube 18 for measuring velocity pressure, and the static pressure measuring tube 16 exhausts through one or a plurality of holes 96 which are positioned in the side of the pitot assembly 92 and are used to sense the static pressure forces acting thereon.

Above ground connections and mechanisms similar to those shown in FIG. 1 can be used for all of the various constructions shown. Although four different double tube embodiments of the present device are shown and described, many others could also be used without departing from the scope of the invention. The particular one that is selected, however, will depend in part upon the kind of system in which it is to be used, the accuracy desired, whether the system has waste materials or solids in it and the kind of information that is desired.

Once data as to the static and velocity pressures has been obtained from the pressure sensitive means or instruments 62 and 64, the volume flow rate ($Q$) as well as other information can be readily determined for that particular location being measured. Determination of the flow rate is accomplished by first calculating the static head ($h_s$) from the static pressure reading ($p_s$) using the formula $h_s = p_s/W$, where $W$ is the specific weight of the flowing fluid in question. The distance ($H_1$) that the selected static tube end 22 is above the bottom or floor of the main 12 which is a known fixed distance is then added to the static head ($h_s$) to determine the total actual depth of fluid (H) in the main 12 at the point of measurement. This information can be obtained at a particular time or continuously over any desired time period.

The velocity head ($h_v$) is then calculated for a particular instant of time from the pressure ($p_v$) data which is obtained from the velocity measuring tube 18 and its associated means using the formula $h_v = p_v/W - H + H_2$, where $H_2$ is the vertical distance from the bottom of the main 12 to the place in the stream where the velocity measuring tube end 24 is located. The fluid velocity ($V$) at the tube end 24 is then calculated from the formula $V = \sqrt{2gh_v}$, where $g$ is the constant for the acceleration of gravity.

As shown by the velocity profile included in FIG. 7, the velocity of a fluid flow in a pipe or conduit varies becoming faster the greater the distance from the surface of the pipe or conduit. The velocity may also vary with other factors including the viscosity characteristics of the fluid and the surface characteristics of the pipe. The velocity profiles of most standard pipes and conduits for different flow depths, surface roughnesses, and for water or water like substances, have been experimentally determined and are available. Since the height ($H_2$) of the velocity measuring tube end above the bottom of the main is known and the depth ($H$) of the flow has been calculated, the calculated velocity can be used to find the mean velocity ($V_m$) of the flow. This is done by using the experimentally determined velocity profiles such as the one shown in FIG. 7, Knowing the pipe or main configuration, the surface conditions thereat and the determined fluid depth ($H$) enables the selection of the proper profile. The calculated velocity $V$ at the depth $H_2$ forms a point on the profile and allows calibration of the profile for the velocity at any depth. The mean velocity $V_m$ which is the average velocity at which the fluid can be assumed to flow for further calculations is always a constant point on any one particular profile since it depends only on the relative shape of the profile which does not change. Therefore once the profile has been calibrated for velocity, the mean velocity $V_m$ can be directly determined therefrom. Once the mean velocity has been determined for the known depth of fluid, and the cross-sectional area ($A$) of the flow is calculated from the depth ($H$) of the flow and geometry of the sewer main which can be measured, the total volume flow rate ($Q$) can then be calculated using the formula $Q = AV_m$.

Since the size, surface characteristics and downward slope of a main at any given location are constant factors, once the whole range of expected flow depths and velocities have been determined using information obtained by the device 10, the rate of flow can thereafter be determined using only one tube such as the tube 16, cross-calibrating the date obtained therewith with the data obtained by the complete two tube device 10 as aforesaid. This is so because the velocity of the flow assuming the fluid characteristics remain the same, in large measure depends upon the depth of fluid flowing in the main and the geometry and surface conditions of the main, and therefore once the depths of the fluid have been calibrated to the flow rate only the depth need to be determined to determine the other desired information.

A structurally much simpler instrument such as the instrument 102 shown in FIG. 8 can be utilized once the main has been calibrated. The instrument 102 includes a gas supply, a single rotometer 58, a single pressure sensitive means 62, and only the one measuring tube 16 including particularly one that exhausts downstream and is therefore not as subject to being clogged, thereby eliminating the need to provide special means such as air blast means to unclog or clear it. If the simpler form of the instrument 102 is to be used it may be necessary or desirable before installing it to use a device such as the device 10 with a similar type static tube end to initially obtain information from which readings later obtained using the device 102 can be meaningfully compared and interpreted The static measuring portion of the device or instrument 10 by itself or the similar simpler instrument 102 requires less air or gas than is required when two tubes are used, and therefore it may also be possible with the simpler construction to use a less expensive form of pressure source including for example a charged container which can be recharged or replaced at intervals when necessary. This would also permit operation of the device at locations which are generally inaccessible to electric or other types of power. Like the two tube device 10, the one tube device 102 can also use pressure regulator means instead of a rotometer to maintain a constant pressure in the measuring tube, if desired, in which case it includes means to measure the gas flow rate rather than the gas pressure. Means similar to the subassemblies 32 may also be required with the simplified construction 102 to maintain it in proper operating position in the flow.

There has thus been shown and described novel waste water measuring means which fulfill all of the objects and advantages sought therefor. It will be apparent to those skilled in the art, however, that many changes modifications, alterations, variations, and other uses and applications of the subject device are also possible. All such changes, modifications, alterations, variations, and other uses and applications which do not depart from the spirit and scope of the invention are deemed to be covered by this invention which is limited only by the claims which follow.

What is claimed is:

1. Means for gathering data from which the flow rate of a flowing fluid in an inclined closed wall conduit open to atmospheric pressure can be continuously determined after the velocity profile of the conduit has been calibrated for the velocity at almost any depth taking into account the surface characteristics thereof and the size, shape and inclination of the conduit at the location where the data is to be gathered and the fluid that is flowing, including gas supply means having a gas outlet, gas control means for establishing a predetermined condition of the gas at the outlet of the gas supply means, conduit means having an inlet end connected to the gas supply outlet and an open outlet end including means for maintaining said outlet end immersed at a predetermined position adjacent to the bottom of the flowing fluid in the conduit so that gas from said gas supply means can flow through said conduit means and escape into the flowing fluid out the immersed open end thereof and is affected by the depth of the fluid thereabove, and means connected to said conduit means for indicating a condition of the gas therein, the indications produced by said gas condition indicating means varying in response primarily only to the depth of the fluid at the immersed open end of the conduit means.

2. The means defined in claim 1 wherein said means for establishing a predetermined condition of the gas include gas flow regulator means, and said gas condition indicating means include means responsive to the gas pressure in the conduit means.

3. The means defined in claim 1 wherein said means for establishing a predetermined condition of the gas include gas pressure regulator means, and said gas condition indicating means include means responsive to the flow rate of the gas in the conduit means.

4. The means defined in claim 1 including second conduit means bypassing said gas control means, and valve means to control communication through the second conduit means to selectively communicate the gas supply means and the aforesaid conduit means, said valve means being movable from a closed position preventing communication through said second conduit means and an open position in which gas is caused to pass directly from the gas supply means into the said conduit means bypassing said control means.

5. The means defined in claim 4 including timer means to control the operation of the valve means.

6. The means defined in claim 4 including means responsive to the occurrence of a pressure condition of the gas in the conduit means in excess of the predetermined established condition, said last named means including means for opening the valve means whenever said excess pressure condition exists.

7. Means for gathering data from which the depth and velocity of a flowing fluid in an inclined conduit under atmospheric conditions can be determined after the velocity profile of the conduit has been calibrated for the velocity at almost any depth taking into account the surface characteristics thereof and the size, shape and inclination of the conduit at the location where the data is to be gathered and the fluid that is flowing, including gas supply means having an outlet thereto, means at the outlet of the gas supply means for establishing a predetermined condition of the gas thereat, first and second conduits each having an inlet end connection to be supplied gas at said predetermined condition and an outlet end, means for maintaining the outlet ends of said conduits immersed at predetermined positions in the flowing fluid so that gas from said gas supply means flows through said conduits and escapes into the flowing fluid out the immersed open ends thereof, said first and second immersed conduit ends being positioned in the flowing fluid at locations such that the gas flowing out the first outlet end is affected by the depth and velocity of the fluid thereat, and the second outlet end is primarily affected only by the depth of the fluid thereat, and other means connected to said first and second conduits for indicating respective conditions of the gas therein, the respective indications produced having known relationships with the depth and velocity of the fluid at the respective immersed open ends of the said conduits.

8. The means defined in claim 7 wherein said means to maintain the immersed conduit ends at predetermined positions in the flowing fluid include a weighted assembly through which portions of the immersed conduits extend, said weighted assembly including means to facilitate lateral movement of the immersed conduits to maintain a proper position thereof with respect to the bottom of the flowing fluid.

9. The means defined in claim 7 wherein the immersed open end of said second conduit is maintained adjacent to the bottom of the flowing fluid.

10. The means defined in claim 7 wherein the immersed open end of said second conduit is facing downstream in the flowing fluid.

11. The means defined in claim 7 wherein the immersed open end of said second conduit faces substantially perpendicular to the direction of flow of the flowing fluid.

12. The means defined in claim 7 wherein the immersed open end of said first conduit is maintained a predetermined distance above the bottom of the flowing fluid and faces in a generally upstream direction.

13. The means defined in claim 12 wherein the immersed open ends of the said first and second conduits are maintained at a similar predetermined distance above the bottom of the flow.

14. The means defined in claim 13 including means forming a knife edge adjacent to said immersed upstream facing conduit open end.

15. The means defined in claim 7 wherein the said open conduit ends are formed by associated orifice forming means.

16. A device for gathering data from which to determine the flow characteristics of a fluid flowing in an inclined closed wall conduit under atmospheric conditions after the velocity profile of the conduit has been calibrated for the velocity at almost any depth taking into account the surface characteristics thereof and the size, shape and inclination of the conduit at the location where the data is to be gathered and the fluid that is flowing, comprising a tube having an end that is open and immersed in the fluid flow to a position adjacent to the bottom of the flow in the conduit said tube having an opposite end, a source of gas connected to said tube opposite end for supplying gas thereto, means for maintaining a predetermined condition of gas flowing from said source into said tube, and other means connected to said tube for responding to a predetermined condition of the gas therein, the said predetermined condition being dependent in part on the depth to which the open end of the tube is immersed.

17. The device defined in claim 16 wherein said immersed tube end is positioned in the flow facing downstream, said predetermined condition to which said other means respond being dependent primarily only on the depth of the fluid above the immersed open end of said tube.

18. The device defined in claim 16 including a second tube having an open end immersed in the flow facing upstream, means for maintaining a predetermined condition of gas flow from said source through said second tube, and means connected to said second tube for responding to a predetermined condition of the gas therein, said predetermined condition of the gas in said second tube being dependent in part on the velocity of the flow at the said immersed open end thereof.

19. The device defined in claim 16 wherein said means for maintaining a predetermined condition of the gas flowing from said source include flow regulator means.

20. The device defined in claim 16 wherein the means for maintaining a predetermined condition of the gas flowing from the source include gas pressure regulator means.

21. Means for obtaining data from which the depth, velocity and volume flow characteristics of a flowing fluid stream in an inclined flow channel under atmospheric conditions can be determined after the velocity profile of the conduit has been calibrated for the velocity at almost any depth taking into account the surface characteristics thereof and the size, shape and inclination of the conduit at the location where the data is to be gathered and the fluid that is flowing, comprising means for monitoring the flowing fluid to obtain data from which the depth, velocity and volume flow characteristics can be monitored and determined, said last named means including a pair of tubular members having means at one end of each forming an open outlet, means connected to the opposite ends of said pair of tubular members for introducing therein a supply of a gas at a predetermined condition such that the gas will pass through the tubular members and out the open outlets thereof, means for positioning the open outlets of said tubular members in the flowing fluid such that one of said open outlets is faced in a direction in the flowing fluid to be affected substantially by the velocity of the flowing fluid thereat, the open outlet of said other tubular member being positioned in the flowing fluid adjacent to the bottom thereof to be affected substantially only by the depth of the fluid thereabove, and means associated with each of said tubular members for responding to a condition of the gas flowing therein, said last named means including means for producing indications representing respectively the velocity and depth characteristics of the flowing fluid at the said open outlets.

* * * * *